Feb. 20, 1934. R. S. KIRK 1,948,302
MACHINE FOR SHAPING TIRES AND INSERTING AIRBAGS
Filed April 9, 1930 2 Sheets-Sheet 1
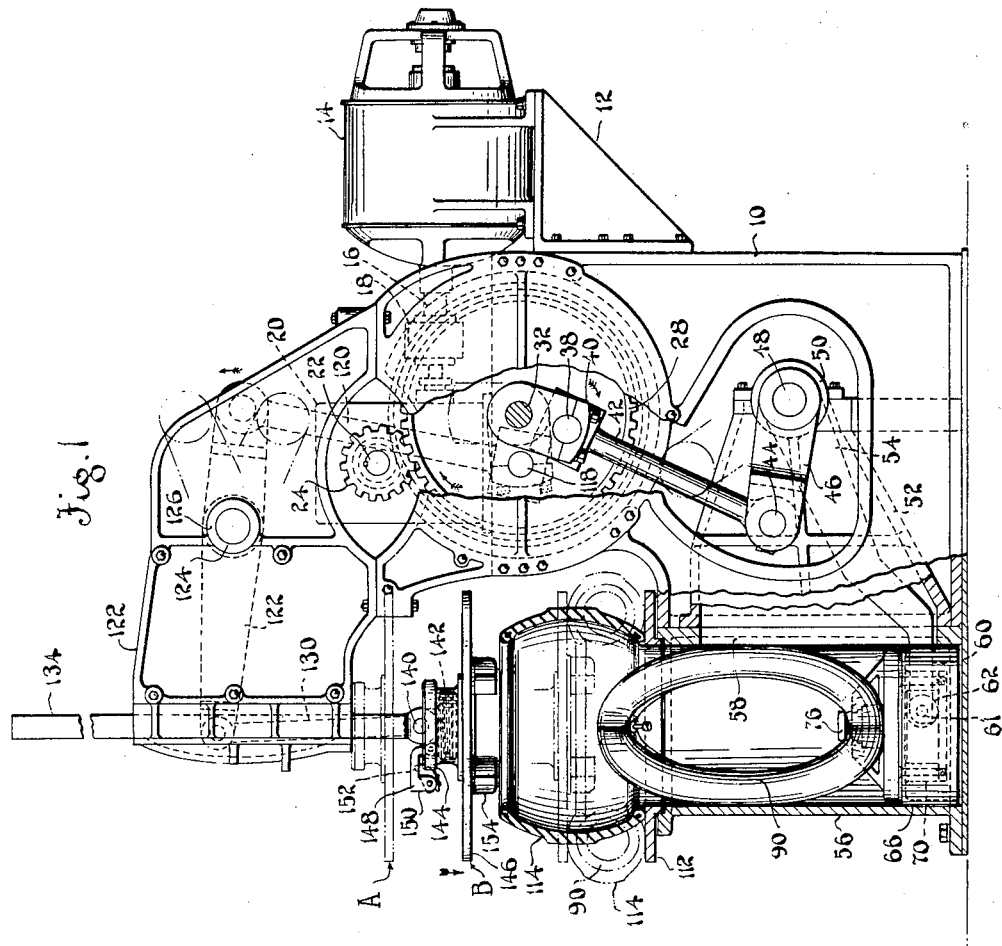
Inventor
Raphael S. Kirk
Attorney Feb. 20, 1934.　　　　　R. S. KIRK　　　　　1,948,302
MACHINE FOR SHAPING TIRES AND INSERTING AIRBAGS
Filed April 9, 1930　　　2 Sheets-Sheet 2
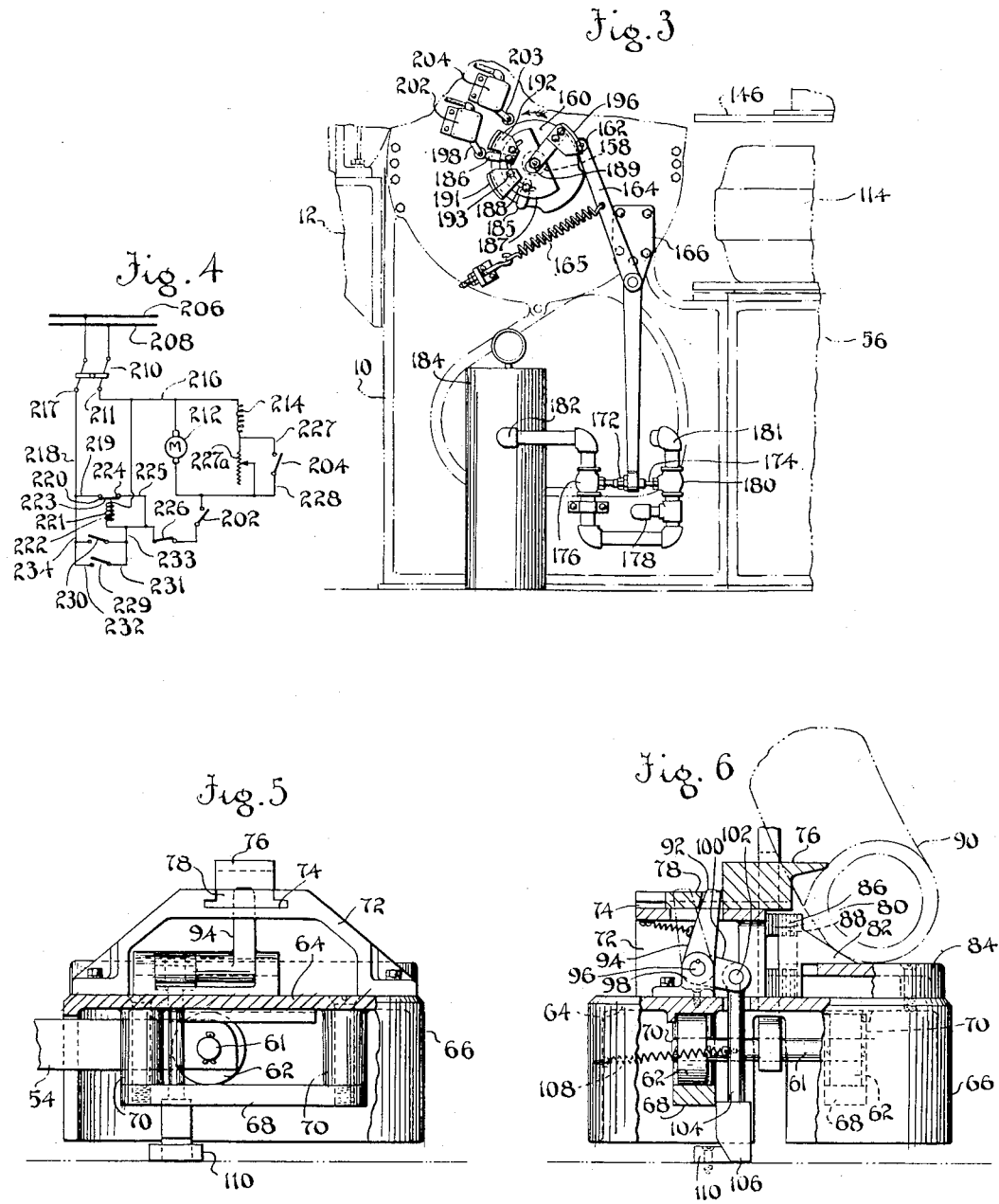
Inventor
Raphael S. Kirk
By
Attorney Patented Feb. 20, 1934

1,948,302

UNITED STATES PATENT OFFICE 1,948,302

MACHINE FOR SHAPING TIRES AND INSERTING AIRBAGS

Raphael S. Kirk, Akron, Ohio, assignor to Wingfoot Corporation, Wilmington, Del., a corporation of Delaware Application April 9, 1930. Serial No. 442,972

7 Claims. (Cl. 18—2)

This invention relates to machinery for manufacturing pneumatic tires and it has particular relation to machines for manufacturing such tires by the so-called "flat built" method from cylindrical bands.

The object of the invention is to provide an improved machine for simultaneously and automatically shaping pneumatic tire bands and inserting pneumatic curing tubes or airbags or other inflatable formers therein.

According to one common method of manufacturing pneumatic tires, the various plies and units of material are assembled upon a collapsible revolving drum of substantially cylindrical contour. Since bands so assembled have substantially the contour of the face of the drum upon which they are formed after their removal from the drum, the tread portions thereof must be expanded in order to impart thereto the toroidal contour which is characteristic of pneumatic tires. Various devices for and methods of performing this shaping operation have been employed. One common form of device comprises a mechanically expansible core which is placed within the cylindrical band and then expanded to impart toroidal shape thereto. Another common type of shaping device includes a vacuum box or chamber of annular shape having an inner periphery of such size as snugly to receive a band. In operation of this device, the band is disposed within the circumference of the chamber. Suction is then created within the latter and about the outer periphery of the band, thus causing the tread portion of the band to be forced outwardly into toroidal form within the chamber.

After the tires have been shaped by either of these methods, it is necessary to insert therein a pneumatic tube, commonly termed an "airbag", or other inflatable former, which is adapted to maintain the tire in expanded condition during the process of vulcanization in the curing molds. The tubes employed for this purpose are of comparatively massive construction and are relatively difficult to flex, particularly when they are of such proportions as those employed in the larger sizes of vehicle tires. Accordingly, a considerable expenditure of manual strength is required upon the part of an operator to flex the bag into such condition that it may be readily inserted in position.

Heretofore various mechanisms have been proposed for flexing the bags mechanically prior to their insertion in the tire. However, most of the devices heretofore employed have been incapable of simultaneously shaping the tires and inserting the bags therein. For that reason, it was necessary to perform the shaping operation and the insertion of the airbag therein as two separate and distinct steps in which the expanded tires were manually transferred from one machine to the other. In addition to being objectionable because of the time lost and the labor expended, this dual handling was unsatisfactory because the freshly expanded tires tended to contract while they were being transferred thus rendering it difficult properly to expand the airbags into nested relation therein.

This invention contemplates the provision of a machine in which the shaping of the tire bands and the insertion of the airbags is completed simultaneously and at a single operation without the intervention of manual labor other than that required for disposing the airbags and the tire bands in position within the machine.

For a better understanding of the invention, reference may now be had to the accompanying drawings, forming a part of the specification, in which:

Fig. 1 is a side view partially in cross-section and partially in elevation of a machine embodying the invention;

Fig. 2 is a view partially in cross-section and partially in elevation taken at right angles to that of Fig. 1;

Fig. 3 is a detailed view of the cam mechanism employed for synchronously controlling the operation of the machine;

Fig. 4 is a conventional diagram of the electrical circuit employed in controlling the operation of a motor;

Fig. 5 is a fragmentary view partially in elevation and partially in cross-section of a piston for forcing an airbag into a tire casing; and Fig. 6 is a view partially in cross-section and partially in elevation of the mechanism disclosed in Fig. 5, but facing in a direction substantially at right angles to that disclosed in the former figure.

In practicing the invention, a frame or base 10 of substantially rectangular cross-sectional contour is provided upon one side thereof with a supporting bracket 12 upon which is mounted a motor 14. The motor is equipped with a forwardly projecting driving shaft 16 secured by means of a coupling 18 to a reduction gearing 20. This latter element is mounted upon the upper face of the frame 10 and is provided with a transversely projecting driving shaft 22 which is equipped at the extremities thereof with driving pinions 24 and 26 which in turn engage bull gears 28 and 30 respectively. These gears are supported for rotational movement upon independent but coaxially mounted shafts 32 and 34 which are provided with a common bearing 36 formed transversely of the frame 10. For purposes which will be explained later, the pinions and gears are of such ratio that the angular velocity of the gear 28 is just twice as great as that of the gear 30.

As clearly indicated in Fig. 1, the gear 28 is provided with a crank pin 38 which rotates within a bearing portion 40 upon the end of a pitman rod 42. This rod is rotatably secured at its lower end to a second crank pin 44 upon a crank arm 46 which constitutes means for oscillating a horizontally disposed shaft 48. The shaft in turn is journaled in a bearing portion 50 formed upon an extremity of a fluid tight casing 52 which houses an oscillating lever 54 which is rigidly attached to the shaft 48.

As also indicated in Fig. 1, the extremity of the casing 52 opposite to the bearing 50 is secured to the sidewall of a vertically disposed airbag receiving cylinder 56 in such manner as to enclose a longitudinally formed slot 58 formed in said wall. The forward extremity of the arm 54 is provided with an offset portion 60 projecting through the slot 58 and equipped with a transversely extending shaft 61 upon which is mounted a pair of piston operating rollers 62.

These rollers (Figs. 5 and 6) are mounted for movement between a head portion 64 of a piston 66 and a pair of parallel guide plates 68, which are mounted upon bosses 70 upon the lower surface of the head portion 64. The upper face of the portion 64 is formed with a housing 72 having a groove 74 of inverted T-shape formed in the upper face thereof. This groove constitutes a guideway for a reciprocable airbag hook 76 having a base portion 78 so shaped as to conform to the contour of the groove. The housing 72 is formed with parallel forwardly projecting portions 80 immediately beneath the forward extremity of the hook 76 for purposes of receiving the rear portion of a wedge-like member 82. This member is disposed upon a platform 84 upon the upper surface of the head portion 64 of the piston 66 and constitutes means for accurately locating an airbag 90 upon the latter element.

The wedge 82 is provided with flanges 86 which project into slots 88 which constitute means for securing the wedge in various positions of adjustment upon the platform 84. In order to retract the hook 76 from engagement with the airbag 90, a slot or opening 92 in the base portion 78 receives the upwardly projecting extremity of an arm 94 which is mounted rigidly upon an oscillating shaft 96. This shaft is mounted in and is supported by bearings 98 upon the head portion 64. The shaft 96 is also provided with a second rigidly mounted arm 100, which is attached by means of a pin 102 to a vertically disposed rod 104 having an integral block 106 at the lower extremity thereof. This block is designed to hook under the adjacent guide bar 68 when the hook 76 is in forward position whereby to insure that the latter will remain in that position until it is released. The rod 104 is also held in engagement with the bar 68 by means of a tension spring 108 which is secured to a side portion of the piston 66. At the extreme lower limit of travel of the piston 66, the block 106 engages a cam 110 which may be secured to the floor or any other convenient support and which functions to release the block 106 from the bar 68 whereby to permit upward actuation of the rod 104.

As best shown in Fig. 1, the upper extremity of the cylinder 56 constitutes a support for an annular ring 112 which supports a tire band 114 while it is being shaped and while an airbag is being inserted therein. In order to facilitate accurate centering of the bands with respect to the opening in the cylinder, an upwardly projecting bead engaging flange 116 is formed about a portion of the inner periphery of the annulus.

The bull gear 30 is provided with a crank pin 118 which is substantially similar to the pin 38 and which has mounted thereon an upwardly extending pitman rod 120 substantially similar to the pitman rod 42 which has been described. The rod 120 is pivotally attached at its upper extremity to an extremity of a lever 122 which is mounted upon a transversely extending shaft 124. The latter element in turn is journaled in bearings 126 formed in upwardly and forwardly extending frame portions 128 which are bolted or otherwise suitably fastened to the base 10. The remaining extremity of the lever 122 is pivotally attached to a second vertically disposed but downwardly projecting pitman rod 130 which is mounted for slight oscillating movement within a slot 132 formed within a vertically disposed cross head 134. This member is disposed for sliding movement between guides 136 which are bolted to the forward faces of the frame members 128. The lower extremity of the pitman rod 130 is hinged upon a pin 140 transversely mounted within the lower portion of the crosshead 134.

The cross-head 134 is also provided with a screw threaded head 142 upon which is threaded an integral sleeve 144 of a plate 146 that functions to close the opening within the circumference of the upper bead of the tire band 114 during the operation of shaping the latter. For purposes of securing the cross-head 134 in any desired position of adjustment upon the head 142, a radially projecting arm 148 is hinged to the upper portion of the head 142 and is provided at the outer extremity thereof with a downwardly projecting bifurcated portion 150 within which is mounted a detent or latch 152. This detent is designed to drop into slots formed in the side of the member 144 in order to prevent rotation of the latter. The lower face of the plate 146 is formed with wedge-like guide blocks 154 designed accurately to deflect and guide the upper portions of airbags into position within tires when the bags are moved upwardly by means of the piston 66.

As shown in Figs. 2 and 3, automatic operation of the machine is secured by means of a mechanism which includes a crank arm 156 upon the outer extremity of the arm 118. This arm in turn is rigidly secured to a stub shaft 158 which is mounted for rotational movement in a bearing formed in the frame in coaxial alignment with the shaft 34. The outer extremity of the shaft 158 is provided with a cam plate 160 which is rigidly secured thereon and which engages a small roller 162 upon a lever 164. Contact between the roller and cam plate is maintained by means of a spring 165 which is attached to the lever and to a portion of the frame 10.

The lever is pivoted intermediate its length to a bracket 166 upon the side of the base 10 in such manner that the lower extremity thereof engages nuts 172 upon a horizontally disposed longitudinally reciprocating valve controlling rod 174. One extremity of the latter operates an inlet valve 176 designed to admit fluid (preferably air) under compression to the casing 52 through an inlet conduit 178. Escape of the fluid occurs at the conclusion of the operation of inserting the bag through an exhaust valve 180 which is controlled by the other extremity of the valve operating rod and which is connected to a conduit 181 upon the inlet conduit 178. Fluid under compression for expanding the tire bands is supplied to the valve 176 through a suitable conduit 182 which leads to a pressure regulating tank 184.

A pair of switch operating lugs 185 and 186 are secured to the forward face of the cam disc 160 and a plate 187 having an arcuate slot 188 is secured thereagainst by means of a bolt 189 which is threaded into the end of the shaft 158. The slot 188 constitutes means for adjustably supporting switch operating cams 191 and 192, which are secured to the forward face thereof, by means of bolts 193 that are mounted within the slot. An additional switch operating cam 196 is also adjustably secured to the face of the plate 187 in the plane of cams 191 and 192 by means of the bolt 189 previously mentioned. The lugs 185 and 186 are so disposed as to engage at desired intervals the lever 198 of a stop switch 202 which controls operation of the motor 14. Simultaneously with this operation, the associated cams 191 and 192 operate an arm 203 of a switch 204 in order dynamically to break the momentum of the motor and the associated mechanism whereby to prevent over-travel of the latter. The cam 196 also independently engages the arm 203 at a predetermined point in the cycle of operation in order temporarily to check the speed of the motor. The purpose for so controlling the operation of the motor will be explained in detail later.

The electrical circuit employed for supplying current to the motor includes a pair of parallel bus bars 206 and 208 which are connected to a suitable double switch 210. A pole 211 of the switch in turn is connected to a side of an armature 212 and the field coil 214 of the motor 14 by means of a conductor 216. The other pole 217 of the switch is connected to a conductor 218, a branch 219 of which leads to one pole 220 of a relay switch 221 which includes a solenoid 222 and a plunger 223. The remaining pole 224 of the relay switch is connected to the remaining sides of the armature 212 and the field coil 214 by means of a conductor 225 which includes within its circuit, a manually controlled stop switch 226 and the cam operated stop switch 202 previously referred to. A field rheostat 227a for controlling the speed of the motor 14 is also disposed in this circuit and is shunted by a speed controlling switch 204 which has previously been described and which is connected to opposite ends thereof by conductors 227 and 228. In order initially to elevate the plunger 223 and thus to bridge the space between the poles 220 and 224 of the relay switch, a pedal operated switch 229 and a hand operated switch 230 are connected in parallel relation by means of conductors 231 and 232. These conductors in turn are respectively connected to the solenoid 222 and the conductor 218 by means of conductors 233 and 234.

In the operation of the machine, it will be assumed that the plunger 223 is depressed to leave a gap between poles 220 and 224 and that the switches 202 and 226 are closed while the switches 229, 230 and 204 are opened. Operation of the motor 14 is then initiated by momentarily closing either of the switches 229 or 230 to close the circuit of the solenoid 222, thereby to lift the plunger and thus to close the circuit between the poles 220 and 224. Current then flows through the conductor 218, plunger 223, conductor 225, switches 226 and 202 to the armature 212 and the field coil 214 of the motor 14. The electrical circuit is completed through the conductor 216. At a predetermined point in the cycle of operation, the cam 196 operates the speed controlling switch 204 to shunt the rheostat 227a and thus to retard the motor. Also, at certain other points in the cycle, the lugs 185 and 186 open the switch 202 thus to stop the motor. Also, as previously stated, for the purpose of absorbing the kinetic energy of the mechanism, operation of the switch 202 is immediately preceded by the closing of the switch 204 by the corresponding cams 191 and 192, whereby to shunt the field resistance 227a. It is to be understood that opening of the switch 202 de-energizes the solenoid 222 and permits the plunger 223 to drop, thus preventing further operation of the motor 14 until the switch 229 or 230 is operated.

In order to shape a tire band and insert an airbag therein, it will be assumed that the piston 66 is at the upper limit of its travel in the cylinder 56 and that the plate 146, together with the cross-head 134, is also at the upper extremity of its path of travel in the position indicated at A. The hook 76 is then manually moved forwardly and the airbag which is to be inserted within the tire casing is engaged thereby, as indicated in Fig. 6. The switch 229 or 230 is next operated to energize the motor and thus to cause the arm 54 to be swung downwardly to draw the piston to the lower extremity of the cylinder and thus to pull the airbag into the position within the cylinder indicated by the full lines in Fig. 1. As the piston approaches the lower limit of travel, the block 106 engages the cam 110 thus freeing the block from engagement under the bar 68 and permitting the rod 104 to move upwardly thus retracting the hook 76 from engagement with the bag. At the conclusion of this operation, because of the ratios of the pinions 24, 26 and gears 28, 30, the piston plate 146 will have partially descended to assume the position indicated at B in Fig. 1. At this point the lug 186 opens the switch 202 and thus stops the motor 14. The tire band 114 is next disposed upon the plate 112 in a position to receive the airbag. By operating one of the starting switches 229 or 230, the motor is energized to cause the plate 146 to travel downwardly into contact with the upper bead of the tire casing and thus to close the space within the circumference of the latter, thereby to provide a fluid tight chamber for the reception of the expanding fluid. When the various elements of the mechanism have reached this position, the cam 160 will have rotated into contact with the roller 162 upon the arm 164 thus causing the latter to operate the rod 174 to open the valve 176 to admit fluid under compression to the cylinder 56. The plate 146 continues its downward travel while at the same time, the piston 66 is operated upwardly to force the upper portion of the airbag 90 into contact with the guide blocks 154. The latter deflect this portion of the bag into the central portion of the tire band 114 which, at this time, is being gradually forced outwardly into toroidal shape by the expansion of the fluid admitted to the cylinder 56. Approximately at the time when the piston 66 reaches the upper limit of travel and when the airbag is being forced completely into register with the freshly formed tire casing, the cam 196 is brought into engagement with the switch arm 203 to close the switch 204 and thus to shunt the rheostat 227a temporarily retarding the motor. By retarding the motor and correspondingly retarding the operation of the pistons 66 and 146, ample time is allowed to permit the bag to spring into proper nested relation within the tire casing before the return movement of the pistons is initiated.

After the airbag has reached its position, the cam 160 will have so rotated as to cause the arm 164 to swing in the opposite position and then to open the exhaust valve 180 to release the pressure within the tire casing. At this time, the cam 196 will have also released the switch 204 whereby to open the shunt circuit about the rheostat 227a and thus to accelerate the speed of the motor 14. The motor then continues its accelerated speed until the pistons 66 and 146 have returned to their initial positions after which the tire casing 114 containing the airbag 90 may be removed in preparation for the insertion of a new casing and airbag.

Although I have illustrated but one form of the invention and have described that form in detail, it will be apparent to those skilled in the art that the invention is not so limited but that various modifications may be made therein without departing from the spirit of the invention or from the scope of the appended claims.

What I claim is:

1. A machine for simultaneously shaping pneumatic tire bands and inserting airbags therein, comprising a driving motor having a projecting shaft, a speed reduction mechanism connected to the shaft, a pair of transversely extending driving shafts projecting from the sides of the speed reducing mechanism and having pinions mounted thereon, gears engaging the pinions, the relative sizes of the gears and pinions being such that one of the gears is rotated twice as rapidly as the other, a crank pin secured to each of the gears, a pitman rod connected to each of the crank pins, pivotally mounted levers connected to the pitman rods, a piston operable by one of said levers, a cylinder arranged substantially coaxially with respect to said piston, a second piston mounted in said cylinder and operable by the other of said levers, means for supporting a tire band on said cylinder, means for supporting an airbag on said second piston, and means for operating said motor to move said first mentioned piston into contact with said tire band to assist in shaping the latter and for moving said second piston toward said first mentioned piston to move said airbag into said tire band.

2. A machine constructed in accordance with claim 1 wherein the second piston is connected to the more rapidly moving gear, and means for utilizing fluid pressure to assist in shaping the tire band.

3. In a machine of the character described, in combination, a pair of coaxially reciprocating pistons, a pair of gear wheels associated with the pistons, mechanism for driving the gear wheels, the ratio of the gear wheels and the mechanism for driving them being such that one of the wheels is driven at a velocity twice as great as the other, and means connecting each wheel to one of the pistons whereby one of the pistons is reciprocated with a frequency twice as great as the other piston.

4. In a machine of the character described, in combination, a cylinder, a piston mounted for reciprocation therein, a second piston mounted for coaxial reciprocation exteriorly of the cylinder, a pair of gear wheels associated with the pistons, mechanism for driving the gear wheels whereby one of the wheels is driven at an angular velocity twice as great as the other, and means connecting each wheel to one of the pistons, said interiorly mounted piston being connected to the more rapidly driven gear whereby to reciprocate with a frequency twice as great as the other piston.

5. In a machine of the character described, in combination, a cylinder, open at one end and having a longitudinal slot in the side thereof, said cylinder being adapted to receive at its open end one side of a tire band in a manner to provide a fluid tight seal between the cylinder and tire band, a fluid tight casing disposed about said slot, a piston mounted for reciprocation in said cylinder, an oscillating lever disposed in the casing and projecting through the slot into operative engagement with the piston, an oscillating shaft to which said lever is rigidly secured, a gear wheel operatively connected to said shaft to oscillate the latter, a second gear wheel associated with the first wheel, a second piston mounted for coaxial reciprocation with respect to the cylinder and the first piston, said second piston being adapted to engage the other side of said tire band to seal the latter, means operatively connecting said second wheel to said second piston to reciprocate the latter, and means for simultaneously driving both gear wheels, said first gear wheel being driven at an angular velocity twice as great as that of the second wheel whereby to reciprocate the first piston with a frequency twice as great as the second piston.

6. A machine for manipulating an airbag comprising a cylinder, a piston mounted within the cylinder, a hook mounted for transverse movement upon one face of the piston, means for reciprocating the piston, and means for retracting the hook at one extremity of movement of the piston.

7. A machine for manipulating an airbag comprising a cylinder, a piston mounted for reciprocation therein, a hook device slidably mounted for transverse movement upon one face of the piston, means for sliding the hook across the face of the piston, means for reciprocating the piston, and means for actuating said sliding means at one extremity of movement of the piston.

RAPHAEL S. KIRK.